Figure 1A:
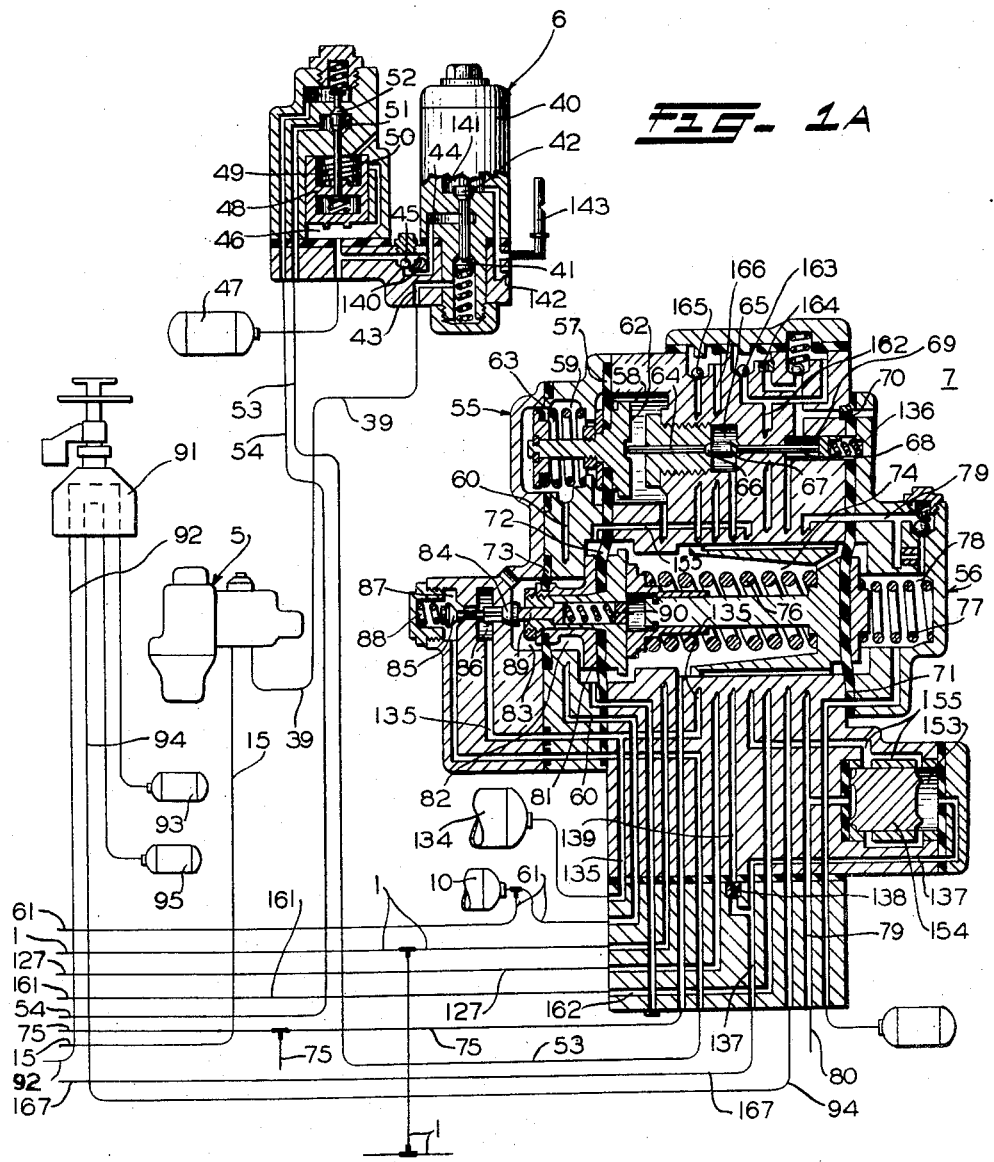

Nov. 18, 1958 A. T. GORMAN 2,860,928
FLUID PRESSURE BRAKE APPARATUS WITH MEANS FOR PREVENTING
IMPROPER SUPPRESSION OF AUTOMATIC TRAIN CONTROL
Filed June 29, 1955 3 Sheets-Sheet 1

INVENTOR.
Andrew T. Gorman
BY
Carebert A. Stemmiller
ATTORNEY

Nov. 18, 1958 A. T. GORMAN 2,860,928
FLUID PRESSURE BRAKE APPARATUS WITH MEANS FOR PREVENTING
IMPROPER SUPPRESSION OF AUTOMATIC TRAIN CONTROL
Filed June 29, 1955 3 Sheets-Sheet 2

FIG-1B

INVENTOR.
Andrew T. Gorman
BY
ATTORNEY

2,860,928

FLUID PRESSURE BRAKE APPARATUS WITH MEANS FOR PREVENTING IMPROPER SUPPRESSION OF AUTOMATIC TRAIN CONTROL

Andrew T. Gorman, Monroeville, Pa., assignor to Westinghouse Air Brake Company, Wilmerding, Pa., a corporation of Pennsylvania Application June 29, 1955, Serial No. 518,735

13 Claims. (Cl. 303—18)

This invention relates to fluid pressure brake equipment and more particularly to the type embodying an automatic train control feature.

In Westinghouse Air Brake Company's Instruction Pamphlet No. 5066, published August 1950, there is shown and described a combined automatic and electro-pneumatic commercial brake equipment, designated as the "24-RL Locomotive Brake Equipment." This equipment comprises a timing valve having a normally energized magnet which becomes deenergized for initiating a train control brake application when the train enters a restricted speed zone or a prescribed speed is exceeded, as indicated by the sounding of a warning whistle. If within a certain period, the engineer actuates the brake valve handle of the usual engineer's automatic brake valve device to effect a brake application of at least a preselected degree, a suppression valve will operate automatically to suppress the train control brake application for a limited time, which may be sufficient to reduce speed below the prescribed speed, as will be briefly described.

When the brake valve handle is moved from a running position (in which a rotary valve is positioned for causing an equalizing reservoir and a first or temporary suppression reservoir to be charged to the normal value of brake pipe pressure), to a first service position for causing a gentle gathering of slack in the train in the well known manner, these reservoirs will be cut off from the brake pipe by the rotary valve; and fluid under pressure will flow from the equalizing reservoir via a restricted port in the rotary valve and through a normally open first service cock or valve to a reduction limiting reservoir that is normally open to atmosphere via a choke, for causing equalizing reservoir pressure to be reduced by equalization into said reduction limiting reservoir and thus cause the usual equalizing valve device to effect a corresponding reduction in brake pipe pressure; and fluid under pressure will also flow from the first suppression reservoir via the rotary valve to a chamber in the suppression valve and thence to atmosphere via a timing choke for causing the suppression valve to operate to temporarily hold off or suppress a train control application of brakes, even if the magnet of the timing valve is deenergized, until pressure in said chamber blows down below a chosen low value. It is, of course, intended that before chamber pressure drops below said low value, the brake valve handle will be moved to a service position for effecting a brake application of a degree sufficient to reduce train speed to within the prescribed speed and thereby reenergize the timing magnet valve. The temporary suppression feature is therefore intended only to desirably suppress a train control brake application during the period when the brake valve handle is in first service position to cause the gentle gathering of slack, and before the brake valve handle is moved to service position for providing an effective brake application.

While this equipment functions very satisfactorily when used in the proper and intended manner, it has been reported that when equipment of this type is used in freight service, wherein the first service position of the brake valve handle is utilized, the engineer can hold off a train control brake application by engaging in an unauthorized practice, consisting of promptly closing the first service cock or valve upon sounding of the warning whistle and then moving the brake valve handle alternately back and forth between first service position and running position, in order to advance the train through the restricted speed zone more rapidly than the prescribed speed without either permitting a train control application or effecting a manual brake application, in the manner now to be described.

When the first service cock or valve is closed, the reduction limiting reservoir is disconnected from the rotary valve. Hence, if the brake valve handle is then moved to first service position, equalizing reservoir pressure cannot equalize into the reduction limiting reservoir and cause an initial reduction in brake pipe pressure, but fluid can flow from the first or temporary suppression reservoir via the rotary valve to the aforementioned chamber of the suppression valve for suppressing a train control brake application so long as pressure in the chamber does not blow down to below said chosen low value, via the timing choke. The first suppression reservoir is rapidly recharged via the rotary valve when the brake valve handle is moved to running position, and first suppression reservoir pressure rapidly equalizes into the suppression valve chamber when the brake valve handle is moved to first service position but pressure in said chamber blows down at a very restricted rate via said timing choke; hence, it is possible by skillful maneuvering of the brake valve handle between first service and running positions to repeatedly recharge the suppression reservoir to prevent pressure in the latter from reducing below the aforementioned low value for thereby preventing the train control brake application.

It is therefore the principal object of this invention to provide an improved fluid pressure brake equipment of the above type embodying novel means for preventing an automatic train control brake application from being suppressed by the improper and unauthorized procedure above described.

According to this object, an interlock valve means is provided which is interposed between the first suppression reservoir and the passage leading to the rotary valve, which passage heretofore had uninterrupted communication with said reservoir. This interlock valve means is operative, when reduction limiting reservoir pressure is below a chosen value, to one position in which it establishes a one-way flow connection whereby fluid under pressure may flow from said passage to the first suppression reservoir for charging the latter but not in the reverse direction; and said interlock valve means is operative, when reduction limiting reservoir pressure is above said chosen value, to a second position in which it connects said first suppression reservoir to said passage in bypass of said one-way flow connection for permitting release of fluid under pressure from the latter reservoir. With this arrangement, if the first service cock or valve is closed when the brake valve handle is moved to first service position, reduction limiting reservoir pressure cannot build up to above said chosen value and hence the interlock valve means will not be operated from its said one position to said second position; hence release of first suppression reservoir air to the suppression valve chamber will be prevented and thus positively prevent an improper suppression, in the above-described manner, of a train control brake application. If, however, the first service valve is open when the brake valve handle is moved to first service position, equalizing reservoir pressure will equalize into the reduction limiting reservoir and thus assure that a reduction in brake pipe pressure will be effected and also cause operation of the interlock valve means to its second position for permitting first suppression reservoir air to flow to the suppression valve chamber to desirably effect a temporary suppression of the train control brake application.

Figure 2:
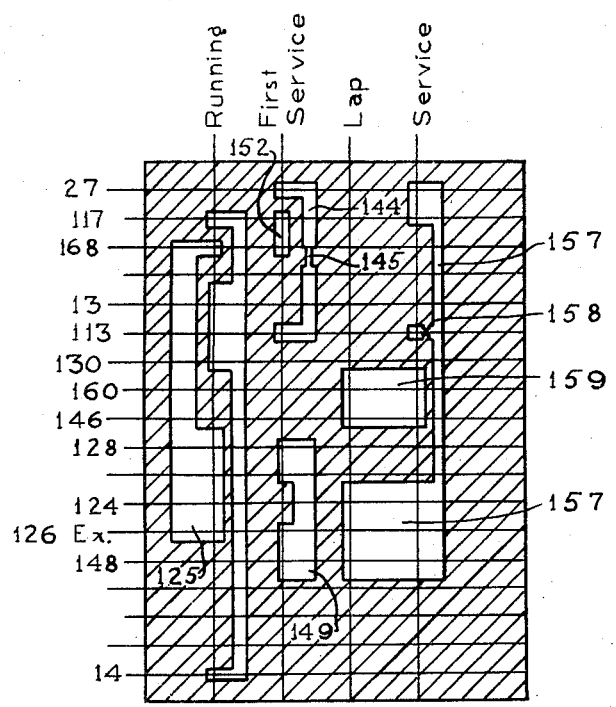

Other objects and advantages will become apparent from the following more detailed description and from the accompanying drawings, wherein Figs. 1A and 1B, when taken together such that the left-hand edge of Fig. 1A is matched against the right-hand edge of Fig. 1B, constitute a diagrammatic view, partly in section and partly in outline, of a locomotive brake equipment embodying the invention; and Fig. 2 is a diagrammatic development view showing connections effected by a rotary valve between various passages in a rotary valve seat upon movement of said rotary valve (shown in Fig. 1B) to certain designated positions.

Description

Since the structure embodying the invention is adapted for use with locomotive brake equipment which may, for sake of illustration, be of the No. 24–RL type, shown and described in the aforementioned Instruction Pamphlet, the disclosure in the accompanying drawings and in the following description has been limited to only such components as are essential to a clear understanding of the invention.

As shown in Figs. 1A and 1B of the drawings, the improved brake apparatus comprises the usual brake pipe 1 that extends from a locomotive through the train for causing brakes on the locomotive and connected cars of the train to be applied to a degree corresponding to the rate and extent of reduction in pressure of fluid therein; and also comprises a feed valve device 2, an engineer's automatic brake valve device 3, a main reservoir 4, a reducing valve device 5, a timing valve device 6, a suppression valve device 7, an equalizing reservoir 8, a reduction limiting reservoir 9, and a suppression reservoir 10 associated with the suppression valve device 7; all of which aforementioned components may, for sake of illustration, be similar to those disclosed and more fully described in the aforementioned Instruction Pamphlet, and which components are essentially similar to those shown and described in United States Patent No. 2,322,042 granted June 15, 1943 to Glenn T. McClure and assigned to the assignee of the present invention.

The brake valve device 3 as illustrated in the drawings is in simplified form with only the ports and connections pertinent to the present invention being shown. This brake valve device comprises, briefly, a sectionalized casing 11 containing a rotary valve 12a operable by movement of a handle 12 to a running position to connect a passage 13 leading to the brake pipe 1 with a passage 14 that is charged with fluid at the normal operating value of brake pipe pressure by operation of the feed valve device 2, which is supplied with fluid under pressure from the main reservoir 4 by way of a main reservoir pipe 15 and a passage 16. The brake valve device 3 also comprises a service application portion 17, a manually operable first service cock or valve 18, an equalizing piston portion or equalizing valve device 19, and a shifter lever (not shown) movable selectively to one position or to another position for conditioning the brake valve device for automatic or electro-pneumatic operation.

The service application portion 17 comprises a piston 20 that is slidably mounted in the casing 11 and is subject at said one side to main reservoir pressure in a chamber 21 that is constantly open to a branch of main reservoir passage 16, and is subject at the opposite side to pressure of fluid in a chamber 22 that is adapted to be vented to atmosphere by way of an application passage 23 but is normally charged with fluid under pressure from the chamber 21 via a bleed port 24 provided in said piston for permitting equalization, at a controlled rate, of fluid pressures in said chambers 21, 22 and passage 23. When the pressures of fluid in the chambers 21, 22 are substantially equal, a helical spring 25 in chamber 22 urges the piston 20 to a normal position, in which it is shown in the drawing, for thereby defining a normal position of a slide valve 26 disposed in chamber 21 and positively connected to said piston. When the chamber 22 is vented via the passage 23, main reservoir pressure in chamber 21 acting on the piston 20 is effective to shift the slide valve 26 to an application position against resistance of the spring 25, for thereby effecting a service rate of reduction in brake pipe pressure and thus causing an automatic train control application of brakes throughout the train, in the well-known manner.

The first service cock or valve 18 is manually operable to an open position, in which it is shown, for connecting a passage 27 leading to the seat of the rotary valve 12a with a passage 28 that is open via a pipe 29 to the reduction limiting reservoir 9; said cock being operable to a closed position for disestablishing such connection.

The equalizing valve device 19, which is shown in simplified form, may comprise, briefly, a suitably clamped flexible diaphragm 30 subject at one side to pressure of fluid in a chamber 31 that is open to the brake pipe 1 and at the opposite side to pressure of fluid in a chamber 32 that is open to the equalizing reservoir 8. The diaphragm 30 is operatively connected through the medium of a follower 33 to a rod 34 which extends through chamber 32 and projects through a bore in a casing partition into a chamber 35; said rod having sealing slidably guided engagement with the wall of said bore. The rod 34 at its projecting end is adapted to abut and unseat a preferably disc-shaped, brake pipe discharge check valve 36 which controls communication between the chamber 35 and a chamber 37; said check valve normally being seated by pressure of a helical spring 38 in said chamber 37.

The reducing valve device 5 comprises valve means (not shown) supplied wih fluid under pressure via a branch of the main reservoir pipe 15 and operative to provide fluid at a preselected reduced pressure in a pipe 39 leading to the timing valve device 6.

The timing valve device 6 comprises, briefly, an electro-magnet 40 that is adapted to be controlled through the train stop signal circuits (not shown) and is energized except when the train enters a restricted speed zone or an authorized speed is exceeded; said magnet controlling operation of a supply valve 41 and an exhaust valve 42, which valve seat in opposite directions. When the magnet 40 is energized, the exhaust valve 42 is seated and the supply valve 41 is unseated for permitting fluid under pressure to flow from the pipe 39, through a passage 43 and past the unseated valve 41 to a chamber 44 and thence past a non-return ball check valve 45 to a chamber 46 and to a timing volume 47. The device 6 also comprises a piston 48 slidably mounted in a casing and normally urged by pressure of fluid in the chamber 46 to a cut-off position against opposing pressure of a helical regulating spring 49 in an atmospheric chamber 50; said piston controlling operation of two oppositely seating, positively connected valves 51, 52. With the piston 48 in cut-off position, the valve 51 is unseated for connecting a pipe 53 to atmosphere via the atmospheric chamber 50; and the valve 52 is seated for preventing release of fluid under pressure from an application pipe 54 which is open to the application passage 23 in the brake valve device 3.

The suppression valve device 7 comprises means operative to provide both temporary and permanent suppression of an automatic train control brake application when brakes are controlled either on the automatic brake pipe reduction principle or the electro-pneumatic straight-air principle. This valve device 7, which may be substantially like that shown and fully described in the aforementioned patent, comprises a reduction insuring portion 55 and a suppression portion 56, both of which are contained within and in part defined by the parts of a sectionalized casing.

The reduction insuring portion 55 comprises a flexible diaphragm 57 subject at one side to pressure of fluid in a chamber 58 open to the brake pipe 1 and at the opposite side to pressure of fluid in a chamber 59 open via a passage 60 and a pipe 61 to the suppression reservoir 10. Secured to the diaphragm 57 is a follower assemblage 62 which is urged in the direction of the chamber 59 by a helical spring 63 in said chamber. Arranged coaxially with the diaphragm 57 is fluted stem 64 which projects through a bore in a plug into a chamber 65, and at its projecting end is connected to a valve 66 which seats in the direction of chamber 58; and said valve 66 is connected to a coaxially arranged oppositely seating valve 67 also disposed in chamber 65 and preferably formed integrally with a fluted stem 68 that projects through a casing partition into a chamber 69 that is open to atmosphere via a timing choke 70.

The suppression portion 56 comprises three coaxially arranged flexible diaphragms 71, 72, 73, the first two of which are of equal area and larger than the area of the diaphragm 73; said diaphragm 72 being intermediate the diaphragms 71, 73. The diaphragm 71 is subject at its side adjacent the diaphragm 72 to pressure of fluid in a chamber 74 normally vented via a power knockout pipe 75 and is also subject at said side to pressure of a helical spring 76; and at the opposite side said diaphragm 71 is subject to pressure of a lighter helical spring 77 and to pressure of fluid in a chamber 78 which is open by way of a passage 79 to a straight-air pipe 80 which is vented in the usual manner via the brake valve device 3 when the latter is conditioned for operation on the automatic brake pipe reduction principle. Since the present invention is concerned with remedying an illegal suppression of train control during operation on the automatic principle, functioning of the apparatus, and hence control of pressure in the chamber 78, during electro-pneumatic operation will not be discussed; and it may be assumed for purposes of the present invention that the straight-air pipe 80 and hence chamber 78 are open to the atmosphere.

The helical spring 76 in chamber 74 acts on one end of a follower assemblage 81, which is arranged coaxially with the diaphragms 72, 73 and positively connects them together for movement in unison, for urging said diaphragms to respective normal positions in which they are shown; said positions being defined by engagement of said follower assemblage with a suitable stop. Between the diaphragms 72, 73 is a chamber 82 and at the opposite side of diaphragm 73 is an atmospheric chamber 83. Coaxially aligned with the diaphragms 72, 73 are two oppositely seating valves 84, 85. Valve 84 is disposed in chamber 83 and controls communication between said chamber and chamber 86; and valve 85 is disposed in a chamber 87 and controls communication between said chamber and the chamber 86. The valves 84, 85 have respective fluted stems which abuttingly engage each other in the intermediate chamber 86. A helical spring 88 in chamber 87 acts on the valve 85 for urging said valve to a seated position and operatively unseating valve 84. However, the follower assemblage 81 carries a coaxially arranged plunger 89 having a limited degree of movement in the direction of chamber 83 and urged in said direction by a helical spring 90 that is also carried by said assemblage and is heavier than spring 88, with the result that when the diaphragms 72, 73 are in their aforementioned normal positions, as shown, the plunger 89 will be biased into engagement with the valve 84 for holding the latter seated and operatively unseating the valve 85 against resistance of spring 88.

The brake apparatus also comprises a manually operable rotary valve 91 which for purposes of the present invention is assumed to be in a freight position, in which it is shown, and in which it connects a pipe 92 to a first or temporary suppression reservoir 93 and also connects a pipe 94 to a timing reservoir 95 to condition the brake apparatus for freight service.

According to the invention, an interlock valve device 96 is provided which may, for sake of illustration, be of the relay type and comprise a flexible diaphragm 97 suitably clamped between sections of a sectionalized casing 98 and subject at one side to pressure of fluid in a control chamber 99 constantly open to the reduction limiting reservoir 9 via a branch of pipe 29, and at the opposite side to pressure of a helical regulating spring 100 in an atmospheric chamber 101. The diaphragm 97 is operatively connected through the medium of a follower 102 to an actuating rod 103 which extends through the chamber 101 and projects through a bore in a casing partition into a chamber 104; said rod having sealing, slidably guided engagement with the wall of said bore. At its projecting end the rod 103 is suitably secured to a supply valve 105 disposed in chamber 104 and adapted to seat against a tapered valve seat which encircles a bore 106 extending through a plunger 107 which, in turn, is slidable within a coaxially arranged bore in the casing 98. The valve 105 has a preferably integrally formed fluted stem 108 which has slidably guided engagement with the wall of bore 106 and which, when said valve is unseated, permits flow of fluid under pressure from the chamber 104 via said bore to a chamber 109 open to the pipe 92. Disposed in chamber 109 and preferably formed integrally with the adjacent end of plunger 107 is an outwardly tapered release valve 110 which is normally urged into seating contact with a tapered seat in the casing by pressure of a helical bias spring 111 in chamber 109.

When the pressure of fluid in the reduction limiting reservoir 9 and hence in control chamber 99 of valve device 96 is below a chosen low value, such as 15 p. s. i., the spring 100 is adapted to urge the diaphragm 97 to a normal position in which it is shown and in which the supply valve 105 is unseated and the release valve 110 is held seated by spring 111.

*Operation*

Assume initially that the main reservoir 4 is charged with fluid under pressure; that the magnet 40 of the timing valve device 6 is energized; that the brake valve device 3 is conditioned for operation on the automatic principle for controlling brakes on a freight train; and that the handle 12 and hence the rotary valve 12a of said brake valve device is in a running position.

Under the assumed conditions, chamber 21 of the service application valve device 17 will be charged with fluid under pressure from main reservoir passage 16, and such fluid will be supplied via the restricted port 24 to chamber 22 of said device, with the result that the slide valve 26 will be maintained in its normal position, as shown, by action of the relatively heavy spring 25. Also fluid at the normal operating value of brake pipe pressure will be supplied by operation of the feed valve device 2 to passage 14 whence it will flow via a chamber 112, in which the rotary valve 12a is mounted, to passage 13 for charging the brake pipe 1 and also charging chamber 58 of the suppression valve device 7. Also, fluid at feed valve pressure will be supplied via chamber 112 to a passage 113, whence it will flow via a cavity 114 in the service slide valve 26 in normal position to a passage 115 that is open to a pipe 116 leading to the equalizing reservoir 8, for charging said reservoir. Fluid at feed valve pressure will also be supplied via chamber 112, a passage 117, a cavity 118 in the service slide valve 26, and a passage 119 to a pipe 120, whence it will flow via a non-return check valve 121 and a pipe 122 to chamber 104 of the interlock valve device 96, and thence past the unseated supply valve 105 to chamber 109 and via pipe 92 and rotary valve 91 to the first suppression reservoir 93 for charging the latter; it being noted that the control chamber 99 of said valve device 96 and the reduction limiting reservoir 9 are vented via pipe 29, a branch of passage 28 by-passing the first service valve 18, a passageway 123 in the service slide valve 26, a passage 124, and a passageway 125 in the rotary valve 12a, which in running position is open to a vent port 126. Also, with the rotary valve 12a in running position, a so-called lockover pipe 127 leading to the suppression valve device 7 is vented via a passage 128, a branch of the passageway 125 and the vent port 126.

Fluid at feed valve pressure is also supplied via the rotary valve chamber 112, a passage 129 in the rotary valve 12a and a passage 130 to a branch of the pipe 61 for charging the permanent suppression reservoir 10 and also charging the chamber 59 of suppression valve device 7.

The chamber 31 of the equalizing valve device 19 is open to the brake pipe 1 via a branch of passage 13 and the chamber 32 is open to the equalizing reservoir 8 via a branch of passage 115. During initial charging, brake pipe pressure will generally not exceed equalizing reservoir pressure, and hence the brake pipe discharge valve 36 of equalizing valve device 19 will be held seated by pressure of spring 38.

With the magnet 40 of timing valve device 6 energized, as above assumed, the timing reservoir 47 will be charged with fluid under pressure and consequently the valve 51 will be unseated for venting pipe 53 which is open to chamber 87 of the suppression valve device 7, and the valve 52 will be seated for preventing release of fluid under pressure from the application pipe 54 and hence from the application passage 23 and chamber 22 of the service application valve device 17, as previously described.

In the suppression portion 56 of suppression valve device 7, the chamber 74 will be vented via the power knockout pipe 75, a passage 131 leading to the seat of the service slide valve 26, and a passageway 132 in said slide valve which is open to a vent port 133. With chamber 74 thus vented, the spring 76 acting through the follower assemblage 81 will maintain the diaphragms 72, 73 in their previously defined normal positions, for causing spring 90 acting through the plunger 89 to hold the valve 84 seated and also the valve 85 unseated against opposition of spring 88. With valve 85 unseated, a stop reservoir 134 will be vented via a passage 135 leading to the chamber 86, which chamber is vented via the unseated valve 85 and chamber 87, which is vented via pipe 53. Also, since the chambers 58, 59 of the reduction insuring portion 55 are charged with fluid at substantially equal pressures from the brake pipe 1 and suppression reservoir 10, respectively, as above described, the spring 63 will urge the follower assemblage 62 in the direction of the left hand to a normal position, for permitting a helical spring 136 disposed in chamber 69 and acting on the fluted stem 68 to operatively unseat the valve 67 through the medium of said stem and at the same time maintain the valve 66 seated. With the valve 67 unseated, a pipe 167 will be open to atmosphere via a passage 137, a choke 138, a passage 139, the chamber 65, and the unseated valve 67 and fluted stem 68, chamber 69 and timing choke 70; it being noted that with the rotary valve 12a in running position, said pipe 167 is also vented via a passage 168 leading to the rotary valve seat and a branch of rotary valve passageway 125 and vent port 126.

Thus, under the assumed conditions, the various components of the improved apparatus will be in the respective positions in which they are shown in Fig. 1 of the drawing.

*Service application of brakes manually effected to prevent a train control brake application*

Assume that, with the brake valve handle 12 in running position and the brake pipe fully charged for maintaining brakes released, a train enters a restricted territory at a speed in excess of that prescribed; and that by previously described operation of the train signal circuits, the timing valve device 6 becomes deenergized. Deenergization of magnet 40 will cause seating of the supply valve 41 and unseating of the exhaust valve 42. With the supply valve 41 seated, further supply of fluid under pressure via the pipe 39 and previously described communication to the timing reservoir 47 and chamber 46 will be cut off. And with the exhaust valve 42 unseated, fluid under pressure will be vented from reservoir 47 and chamber 46 through a choke 140 by-passing the check valve 45, and thence via chamber 44 and unseated valve 42 to a chamber 141, whence it will flow to atmosphere via a timing choke 142 and also to a pneumatically operated whistle 143 for actuating the latter to warn the engineer that an automatic train control brake application is imminent. The timing choke 142 and whistle 143 cooperate to so control the rate at which fluid under pressure is released from the timing reservoir 47 as to provide the engineer a predetermined period of time, such as six seconds, within which to manually initiate an application of brakes.

Assume now that the improved brake apparatus is employed on a locomotive hauling a long freight train, and that within the aforementioned predetermined period the engineer responds to the warning whistle 143 by moving the handle 12 and hence the rotary valve 12a from running position to a first service position (Fig. 2) for effecting a limited degree of service reduction in brake pipe pressure to cause a gentle gathering of slack in the train; whereupon he may move said handle to a service position (Fig. 2) for completing reduction in brake pipe pressure, thereby effecting a so-called split reduction in brake pipe pressure, in accordance with the usual practice, and in the manner now to be more fully described.

Upon movement of the handle 12 to first service position, passage 13 is lapped by the rotary valve 12a for cutting off further flow of fluid at feed valve pressure to the brake pipe 1. Also, a passageway 144 (Fig. 2) in the rotary valve 12a connects passage 113 to passage 27 for causing fluid under pressure in the equalizing reservoir 8 and chamber 32 of equalizing valve device 19 to flow via passage 115, cavity 114 of service slide valve 26 in normal position, passage 113 and passageway 144 to passage 27, and thence, provided the first service valve 18 is in open position, to passage 28, whence it will flow via respective branches of pipe 29 to the reduction limiting reservoir 9 and control chamber 99 of the interlock valve device 96. With this connection established, pressure in the equalizing reservoir 8 will equalize into the reduction limiting reservoir 9 for providing a chosen limited degree of first service reduction in equalizing reservoir pressure at the rate controlled by a service choke 145 (Fig. 2) provided in the rotary valve passageway 144.

During this reduction in equalizing reservoir pressure in chamber 32 of equalizing valve device 19, brake pipe pressure in chamber 31 acting on the opposite side of the diaphragm 30 will deflect said diaphragm for operatively unseating the brake pipe discharge valve 36 against resistance of spring 38. With valve 36 unseated, fluid under pressure will be vented from the brake pipe 1 to atmosphere via a branch of passage 13 into the chamber 35 and thence via a passage 146, a service choke 147, a passage 148 and through a passageway 149 (Fig. 2) in the rotary valve 12a to the vent port 126; it being noted that fluid under pressure will be vented from the brake pipe 1 and chamber 31 at a service rate, as controlled by said choke 147, and that said passage 146 has a branch which leads to the seat of rotary valve 12a and which is lapped by said rotary valve in first service position. Hence the equalizing valve device 19 operates to reduce brake pipe pressure substantially to the same extent and at the same rate as equalizing reservoir pressure is reduced.

Meanwhile, according to the invention, when pressure in the reduction limiting reservoir 9 and hence in control chamber 99 has attained a chosen value, such as about 15 p. s. i., as determined by the chosen value of spring 100, the diaphragm 97 will deflect against resistance of said spring and, through the medium of the follower 102 and rod 103, successively seat the supply valve 104 against the plunger 107 and then through such seating engagement shift said plunger for operatively unseating the release valve 110 against the light resistance of spring 111. With valve 110 unseated, fluid under pressure will flow from the first suppression reservoir 93 via pipe 92 to chamber 109 and thence past the unseated valve 110 and via an annular groove 150 formed in the plunger 107 to a passage 151 formed in casing 98 and constantly open to said groove; and from said passage 151 such fluid will flow via a branch of pipe 120 and in by-pass of the check valve 121 to passage 119 and thence via cavity 118 of the service slide valve 26 in normal position to passage 117. With the rotary valve 12a in first service position, a passageway 152 (Fig. 2) therein connects the passage 117 to passage 168 for permitting fluid under pressure from the first suppression reservoir 93 to flow via the communication just described and passage 168 to pipe 167; and from pipe 167 such fluid will flow via a branch of passage 137 in the suppression valve device 7 to a chamber 153 at one end of a double check valve 154 for shifting the latter leftward and thus permitting such fluid to flow via a passage 155 to the chamber 82 between the diaphragms 72, 73 in the suppression portion 56. Pressure of fluid thus supplied to chamber 82 will cause the net effective force acting on the larger diaphragm 72 to move the follower assemblage 81 toward the right to a suppression position against resistance of spring 77; the spring 76 in chamber 74 acting as a substantially rigid connection during such movement since it is heavier than the spring 77. With the follower assemblage 81 in its suppression position, the plunger 89 carried by said assemblage will be ineffective (due to its limited degree of leftward movement) to prevent the spring 88 from seating valve 85 and operatively unseating valve 84. With valve 85 seated, the pipe 53 will be cut off from the chamber 86, which is open to atmosphere via a communication hereinafter to be described; and so long as said valve 85 is seated, a train control brake application will be suppressed, even if the magnet 40 of the timing valve device 6 should remain deenergized for an extended period and cause operation of the piston 48 to its application position in which valve 52 is unseated for connecting the application pipe 54 to said pipe 53.

With the rotary valve 12a in first service position, the valve 85 will be seated only for a preselected period of time and hence only a temporary suppression of the train control brake application will be effected, as will now be described. It will be recalled that fluid under pressure from the first suppression reservoir 93 is supplied via the pipe 167 and passage 137 to the chamber 82 of the suppression portion 56 of device 7 for permitting the spring 88 to effect closure of the valve 85. However, a branch of passage 137 is open to atmosphere via the choke 138, passage 139, chamber 65, unseated valve 67, chamber 69 and timing choke 70, with the result that pressure in the first suppression reservoir 93 and chamber 82 will blow down via said timing choke which so controls the rate of such blowdown as to suppress a train control brake application for a predetermined period, sufficient to permit completion of a first service reduction in equalizing reservoir pressure and hence in brake pipe pressure; whereupon the brake valve handle 12 and rotary valve 12a should be moved to service position (Fig. 2) for effecting a further reduction in equalizing reservoir pressure and hence in brake pipe pressure by previously described operation of the brake pipe discharge valve 36.

It may also be noted that there is an additional reason why the brake valve handle 12 should be moved promptly to service position after the first service reduction is completed; this reason being applicable even if the manual brake application was not initiated in response to the warning given by whistle 143. After pressure in the equalizing reservoir 8 equalizes at the relatively fast rate controlled by service choke 145 into the reduction limiting reservoir 9 and control chamber 99 of interlock valve device 96, pressure in said reservoirs will blow down at a very restricted rate via the branch of passage 28 by-passing first service valve 18, thence via passageway 123 and a choke 156 in the service slide valve 26 in normal position, and the vent port 133, so that for reasons of train safety the brakes will be gradually applied after the slack has been gently gathered; but said choke 156 is of such limited flow capacity as not to interfere with previously described equalization of equalizing reservoir pressure into the reduction limiting reservoir 9 and control chamber 99 of device 96.

It will be noted that, according to the invention, the interlock valve device 96 is controlled according to pressure of fluid in the reduction limiting reservoir 9 as noted in the control chamber 99 of said device. When the chamber 99 is vented, the valve device 96 will assume a normal position in which it is shown, and in which supply valve 105 is unseated for permitting charging of the first suppression reservoir 93 by flow through previously described communication (including the check valve 121) when the rotary valve 12a is in running position; said check valve preventing release of fluid under pressure from said reservoir 93 to the chamber 82 of the suppression valve device 7 via the rotary valve 12a in first service position and valve device 96 in normal position. If the engineer should close the first service valve 18 and then move the rotary valve 12a to first service position in an attempt to illegally suppress a train control brake application, in the manner heretofore described, fluid under pressure will not be released from the equalizing reservoir 8 into the reduction limiting reservoir 9 and hence into the control chamber 99 with the result that the valve device 96 will remain in normal position, and thus prevent supply of fluid under pressure from the first suppression reservoir 93 to chamber 82 and thereby prevent a suppression of a train control brake application. If the first service valve 18 is in open position, however, passages 27, 28 will be connected and thereby assure that equalizing reservoir pressure will equalize into the reduction limiting reservoir 9 and, by so doing, cause operation of the brake pipe discharge valve 36 to effect a corresponding reduction in brake pipe pressure for effecting a light application of brakes; and meanwhile when equalizing reservoir pressure in the control chamber 99 attains the illustrative value of 15 p. s. i., the diaphragm 97 of valve device 96 will deflect for operatively seating the supply valve 105 and then unseating the release valve 110 so that fluid under pressure may be released, via communication already described, from the reservoir 93 into the chamber 82 for causing operation of the suppression valve device 7 to effect a temporary suppression of a train control brake application. Thus, with the improved brake apparatus, a train control brake application can be temporarily suppressed in first service position of rotary valve 12a only if the first service valve 18 is in open position, in which it will permit a limited application of brakes to be effected for gently gathering slack in the train.

It should be noted that at the time the rotary valve 12a is moved from running to first service position, the equalizing reservoir 8 will be charged to the normal operating value of brake pipe pressure, which is generally about 70 p. s. i. In view of this high pressure head in the equalizing reservoir 8, I have found that the pressure in the previously vented reduction limiting reservoir 9 and control chamber 99 will increase almost instantaneously to the illustratively assumed value of 15 p. s. i. at which the diaphragm 97 of valve device 96 will deflect against resistance of spring 100 for operatively unseating the release valve 110.

Assume now that after the slack in the train has been gathered due to the application of brakes effected by this initial, light, first service reduction in brake pipe pressure, the engineer promptly moves the brake valve handle 12 and rotary valve 12a from first service position to service position (Fig. 2), in which the equalizing reservoir 8 and chamber 32 of device 19 are connected directly to the vent port 126 via passage 115, cavity 114 in the service slide valve 26 in normal position, passage 113, which is then connected via a passageway 157 (Fig. 2) in the rotary valve 12a to said vent port for providing a further reduction in equalizing reservoir pressure at a service rate as controlled by a service choke 158 (Fig. 2 interposed between passage 113 and a branch of said passageway.

Also with the rotary valve 12a in service position, the passages 27, 117, 124, 148 are connected to the vent port 126 via other branches of passageway 157. Hence fluid under pressure will be vented from the reduction limiting reservoir 9 and control chamber 99 of valve device 96 via passage 28 and the vented passage 27, if the first service valve 18 is open, or else via the other branch of passage 28, service slide valve passageway 123, and the vented passage 124. Fluid under pressure will be released from the first suppression reservoir 93 (if not already dissipated via the timing choke 70 of valve device 7) via pipe 92 and the unseated release valve 110, passage 151, pipe 120, passage 119, service slide valve cavity 118 and the vented passage 117, until reduction reservoir pressure in control chamber 99 is reduced sufficiently to cause spring 100 to actuate the interlock valve device 96 to normal position, in which said release valve 110 is closed.

Also, will the rotary valve 12a in service position, a passageway 159 (Fig. 2) therein connects passage 146 (to which fluid under pressure is vented from the brake pipe 1 past the brake pipe discharge valve 36, as already explained) to a passage 160, so that some of such fluid being thus discharged from the brake pipe during the second stage of the service reduction in equalizing reservoir pressure will flow via passage 146, rotary valve passageway 159 and the passage 160 to a pipe 161 and thence via a passage 162 in the suppression valve device 7, past a non-return ball check valve 163 and at the rate controlled by a choke 164 to the chamber 69; said choke being of larger flow capacity than the service choke 158 (Fig. 2) and also of larger flow capacity than the timing choke 70 so that pressure in said chamber 69 will increase at a desired rate. Fluid under pressure thus supplied to chamber 69 will flow via pipe 94 and the rotary valve 91 to the timing reservoir 95 for charging said reservoir at a restricted rate and also flow from said chamber 69 via the unseated valve 67, to passage 139, thence through choke 138 into passage 137, and thence via the double check valve chamber 153 and passage 155 to chamber 82 for maintaining the follower assemblage 81 in its suppression position for maintaining valve 85 seated. Hence during this further service reduction in brake pipe pressure, the train control brake application will also be suppressed.

The rotary valve 12a may be allowed to remain in service position until any chosen degree of service reduction, up to a full service reduction, in pressure in the equalizing reservoir 8 and hence in brake pipe pressure has been effected after which the brake valve handle 12 should be operated to a lap position (Fig. 2) in which venting of fluid under pressure from the equalizing reservoir is terminated for causing brakes to be applied to a degree corresponding to said chosen degree of reduction.

If a full service reduction in brake pipe pressure has been effected, brake pipe pressure in the chamber 58 of the reduction insuring portion 55 of suppression valve device 7 will be reduced sufficiently to cause pressure of fluid in the chamber 59 open to suppression reservoir 10 to shift the diaphragm 57 rightward against resistance of the spring 63 for operatively unseating valve 66 and seating valve 67; it being noted that fluid under pressure was supplied to said reservoir via passage 139 in the running position of the rotary valve 12a and that the latter passage is lapped in the first service, service and lap positions of the rotary valve for bottling up fluid under pressure in said reservoir. With valve 66 unseated, brake pipe pressure will equalize via chamber 58 and the fluted stem 64 into the chamber 65 and via previously described communication including choke 138 and double check valve 154 into chamber 82 for effecting a permanent suppression of a train control brake application so long as the full service brake application is in effect.

If the engineer moves the rotary valve 12a to lap position before a full service reduction in brake pipe pressure has been effected, then pressure of fluid in the timing reservoir 95 will blow down via the unseated valve 67 and timing choke 70, with the result that a train control brake application will be only temporarily suppressed.

If at any time during the first service or the further service reduction in brake pipe pressure the magnet 40 becomes reenergized due to such as a favorable traffic indication, then the engineer may promptly move the brake valve handle 12 to running position for recharging the brake pipe 1 to effect a release of brakes.

*Release of manually effected brake application*

Assume now that the magnet 40 of timing valve device 6 is energized due to a favorable traffic signal. To restore brake pipe pressure for effecting release of a service application of brakes, the handle 12 and rotary valve 12a may be returned to running position, in which they are shown. With the rotary valve 12a in this position, the brake pipe 1 is recharged to normal full charge value with fluid under pressure from the feed valve device 2 via the rotary valve chamber 112 and passage 13; and the equalizing reservoir 8, first suppression reservoir 93 and suppression reservoir 10 will also be recharged to the normal full charge value of brake pipe pressure; and the reduction limiting reservoir 9 and control chamber 99 will be vented, as earlier described.

In actual practice, however, the brake valve handle 12 and rotary valve 12a are preferably moved initially to a release position, in which substantially the same connections are established as in running position, but in which a greater flow capacity of fluid under pressure to the brake pipe 1 is provided for more rapidly recharging the equipment and hence more rapidly releasing brakes throughout the train. Since brakes will be completely released in running position of the rotary valve 12, however, and since the present invention is not affected by whether or not said rotary valve has a release position, the latter position will not be further described.

*Automatic train control brake application*

Assume now that brake valve handle 12 is in running position; that the magnet 40 of timing valve device 6 becomes deenergized due to an unfavorable traffic signal; that the engineer fails to manually effect a brake application despite the warning given by whistle 143; and that valve 52 of said device 6 opens and connects the application pipe 54 to the pipe 53.

Under this condition, fluid under pressure will be vented from the chamber 22 of service application valve device 17 by flow via the passage 23, pipes 54, 53, chamber 87, the unseated valve 85, chamber 86, passage 135, whence it will flow to the vented stop reservoir 134 and also via a non-return ball check valve 165 and a passage 166 to the pipe 127 and via passage 128 to the rotary valve 12a and thence via rotary valve passageway 125 to the vent port 126. With chamber 22 thus vented, main reservoir pressure in chamber 21 acting on the piston 20 will cause the slide valve 26 to be shifted to its application position.

With the service slide valve 26 in application position, a passageway 169 therein connects respective branches of the application passage 23, and passage 128 so that said application passage will be maintained vented even if the magnet 40 should become reenergized; both said branches being blanked off by said slide valve when in normal position. Also fluid at main reservoir pressure will be supplied from the chamber 21 via a passageway 170 in the slide valve 26 to the passage 131 and power knockout pipe 75; and some of such fluid will flow via one branch of said pipe to the usual power knockout device (not shown) for causing it to operate to cut off power to the locomotive so as to prevent burning out of the commutators, and some of such fluid will also flow via another branch of said pipe to the chamber 74 for causing the follower assemblage 81 to be maintained in its normal position, as shown, to prevent suppression of the train control brakes application, even if the engineer should belatedly actuate the brake valve handle 12 to service position.

Also, with the slide valve 26 in application position, fluid under pressure will flow from the equalizing reservoir 8 and chamber 32 of device 19 via passage 115, slide valve cavity 114, and a service choke 171 and a cavity 172 in said slide valve to the passage 28, whence it will flow via pipe 29 to the reduction limiting reservoir 9 and control chamber 99 of interlock valve device 96. The equalizing valve device 19 will respond to this reduction in equalizing reservoir pressure to effect a corresponding reduction in brake pipe pressure, as already described.

For detailed discussion of other connections established by the service slide valve 26 in application position, the reader is referred to the aforementioned instruction pamphlet or patent since such details have no bearing on the present invention.

*Release of a train control brake application*

To release a train control brake application, the magnet 40 of timing valve device 6 must be energized in response to a clear signal indication. When the magnet 40 becomes energized, fluid under pressure will be supplied to the timing reservoir 47 and chamber 46 via the supply valve 41 in the manner already described, for causing the valve 52 to be seated to cut off the train application pipe 54 from the pipe 53 which is vented via previously described communication including unseated valve 85, check valve 165, pipe 127 and vented passage 128. The handle 12 and rotary valve 12a must be moved (if not done previously) to lap position, in which the other branch of passage 128 leading to said rotary valve is lapped so as to cut off venting of the application passage 23 via the service slide valve passageway 169 and said other branch of passage 128. This will permit fluid under pressure flowing through the feed port 24 in the service application piston 20 to effect a gradual build-up in pressure in chamber 22; and when such pressure, as assisted by pressure of spring 25, increases sufficiently, said piston will move and shift the slide valve 26 to normal position; whereupon the rotary valve 12a may be returned to running position (or release position) for recharging the brake pipe 1, in the manner earlier described, so that the train may get under way.

*Summary*

It will now be seen that the improved brake apparatus includes an interlock valve device 96 comprising a control chamber 99 open to the reduction limiting reservoir 9 and valve means operative, so long as said reservoir is vented, to connect the first or temporary suppression reservoir 93 to a communication containing a check valve 121 which permits flow of fluid under pressure to said reservoir 93 for charging the latter in the running position of rotary valve 12a but prevents reverse flow through said communication in the first service position of said rotary valve; said valve means being operative, when pressure in said reduction reservoir exceeds a chosen low value, to connect said suppression reservoir 93 to another communication by-passing the check valve 121 so that fluid under pressure may be released from said reservoir 93 to the suppression valve device 7 in first service position of said rotary valve for effecting a temporary suppression of a train control brake application. With this improved arrangement, fluid under pressure can be thus supplied to the suppression valve device 7 in first service position of the rotary valve only if the first service valve 18 is in open position, in which it permits release of fluid under pressure from the equalizing reservoir 8 to the reduction limiting reservoir 9 and thus enables the equalizing valve device 19 to operate to correspondingly release fluid under pressure from the brake pipe for causing a brake application. If the first service valve 18 is closed, then the reduction limiting reservoir 8 and control chamber 99 will remain vented, and hence the valve device 96 and check valve 121 will cooperate to prevent suppression of a train control brake application when the rotary valve 12a is moved to first service position.

Having now described the invention, what I claim as new and desire to secure by Letters Patent, is:

1. In a fluid pressure brake apparatus, in combination, a volume for storing fluid under pressure, suppression means responsive to pressure of fluid supplied from said volume to a normally vented chamber to effect suppression of a train control brake application, a normally charged equalizing reservoir, a normally vented reduction limiting reservoir into which fluid under pressure in said equalizing reservoir may equalize for causing a limited degree of automatic brake application, a normally open first service valve effective while closed to prevent such equalization, operator controlled brake valve means operable independently of said first service valve and normally in one position for preventing such equalization and supplying fluid under pressure to said volume, one-way flow valve means interposed between brake valve means and volume for permitting such supply of fluid under pressure to said volume and preventing reverse flow, and interlock valve means normally ineffective to permit release of fluid under pressure from said volume and operative by pressure in said reduction limiting reservoir in excess of a chosen value occurring during and in consequence of such equalization to connect said volume to said brake valve means via a communication by-passing said one-way flow valve means for permitting such release, said brake valve means being operable to another position for cutting off such supply to said volume and connecting said chamber to the part of said communication leading to said interlock means, whereby fluid under pressure will be released from said volume to said chamber in said other position of said brake valve means only while said first service valve is open.

2. A fluid pressure brake apparatus comprising, in combination, a volume for storing fluid under pressure, suppression means having a normally vented chamber and responsive to pressure of fluid supplied to said chamber from said volume to effect suppression of a train control brake application, a normally charged equalizing reservoir, a normally vented reduction limiting reservoir into which fluid under pressure in said equalizing reservoir may equalize for causing a limited degree of automatic brake application, a first service valve normally open for permitting such equalization and effective while closed to prevent such equalization, brake valve means manually operable independently of said first service valve and normally in one position for preventing such equalization and operable to another position for causing such equalization provided said first service valve is open, fluid pressure operated valve means operative to assume one position so long as such equalization is prevented for opening one communication between said brake valve means and volume and responsive to a build-up in pressure in said reduction limiting reservoir during and in consequence of such equalization to move to another position for opening another communication between said brake valve means and volume, and valve means for permitting flow of fluid under pressure through said one communication in the direction of and to said volume and preventing reverse flow therethrough, said brake valve means being operative in its said one position to supply fluid under pressure for supply via said one communication to said volume and operative in its said other position to terminate such supply and cause fluid under pressure to be supplied to said chamber via said other communication provided the latter is opened by said fluid pressure operated valve means, whereby fluid under pressure will be released from said volume to said chamber in said other position of said brake valve means only while said first service valve is open.

3. A fluid pressure brake apparatus comprising, in combination, a volume for storing fluid under pressure, suppression means having a normally vented chamber and responsive to pressure of fluid supplied to said chamber from said volume to effect suppression of a train control brake application, a normally charged equalizing reservoir, a normally vented reduction limiting reservoir into which fluid under pressure in said equalizing reservoir may equalize for causing a limited degree of automatic brake application, a first service valve normally open for permitting such equalization and effective while closed to prevent such equalization, brake valve means manually operable independently of said first service valve and normally in one position for preventing such equalization and operable to a first service position for causing such equalization provided the first service valve is open, other valve means for alternatively establishing two fluid pressure communications between said brake valve means and volume and normally in one position for opening one of said communications and responsive to an increase in pressure in said reduction limiting reservoir caused during such equalization to move to another position for opening the other of said communications, means for permitting fluid under pressure to be supplied by said brake valve means in its said one position via said one communication to said volume and preventing reverse flow through said one communication, said brake valve means being operative in its said first service position to open said chamber to the branch of said other communication leading to said other valve means, whereby fluid under pressure will be released from said volume to said chamber only while said other valve means is in its said other position.

4. A fluid pressure brake apparatus comprising, in combination, a volume for storing fluid under pressure, suppression valve means having a normally vented chamber and responsive to pressure of fluid supplied to said chamber from said volume to effect suppression of a train control brake application, a normally charged equalizing reservoir, a normally vented reduction limiting reservoir into which fluid under pressure in said equalizing reservoir may equalize for causing a limited degree of automatic brake application, brake valve means normally in one position for preventing such equalization and operable to a first service position for permitting such equalization, other valve means for alternatively establishing two fluid pressure communications between said brake valve means and volume and normally in one position for opening one of said communications and responsive to a build up in pressure in said reduction limiting reservoir caused during such equalization to move to another position for opening the other of said communications, means for permitting flow of fluid under pressure via said brake valve means in its said one position and said one communication to said volume and preventing reverse flow through said one communication, said brake valve means being operative in its said first service position to supply fluid under pressure to said chamber from said volume via said other communication provided the latter is opened by operation of said other valve means to its said other position.

5. A fluid pressure brake apparatus comprising, in combination, a volume for storing fluid under pressure, suppression means having a normally vented chamber and responsive to pressure of fluid supplied to said chamber from said volume to effect suppression of a train control brake application, a normally charged equalizing reservoir, a normally vented reduction limiting reservoir into which fluid under pressure in said equalizing reservoir may equalize for causing a limited degree of automatic brake application, a first service valve normally open for permitting such equalization and effective when closed to prevent such equalization, brake valve means manually operable independently of said first service valve and normally in one position for preventing such equalization and operable to another position for causing such equalization provided said first valve is open, valve means controlled by pressure of fluid supplied to said reduction limiting reservoir from said equalizing reservoir during such equalization and operative so long as said reduction limiting reservoir is vented to connect said volume to one branch of a communication leading to said brake valve means and responsive to such supply of fluid under pressure to said reduction limiting reservoir to connect another branch of said communication to said volume, and means interposed in said one branch for permitting flow therethrough from said brake valve means toward said volume and preventing reverse flow therethrough and so disposed as to be ineffective to prevent flow through said other branch, said brake valve means being operative in its said one position to supply fluid under pressure to said communication for permitting charging of said volume and operative in its said other position to terminate such supply and connect said communication to said chamber, whereby fluid under pressure will be released from volume to said chamber in said other position of said brake valve means only when the first service valve is open.

6. A fluid pressure brake apparatus comprising, in combination, a suppression reservoir, suppression means having a chamber open to atmosphere via a bleed and responsive to pressure of fluid supplied to said chamber from said suppression reservoir to suppress a train control brake application until pressure in said chamber blows down through said bleed to below a chosen value, a reduction limiting reservoir, an equalizing reservoir, a communication through which fluid under pressure in said equalizing reservoir may equalize into said reduction limiting reservoir for causing a corresponding limited automatic application of brakes, a normally open first service valve effective when closed to close said communication, brake valve means manually operable independently of said first service valve and having one position for charging said equalizing reservoir and venting said reduction limiting reservoir and closing said communication and operable to another position for terminating such charging and venting and opening said communication provided the first service valve is open, a conduit, valve means controlled by pressure of fluid in said reduction limiting reservoir and operative so long as said reduction limiting reservoir is vented to connect one branch of said conduit to said suppression reservoir for permitting charging of the latter and responsive to pressure of fluid supplied to said reduction limiting reservoir from said equalizing reservoir to alternatively connect another branch of said conduit to said suppression reservoir for permitting release of fluid under pressure from the latter, and means for permitting such flow of fluid under pressure through said one branch to said volume and preventing reverse flow therethrough, said brake valve means being operative in its said one position to supply fluid under pressure to said conduit and in its said other position to terminate such supply and connect said conduit to said chamber, whereby fluid under pressure will be supplied to said chamber from said suppression reservoir in said other position of said brake valve means only when said first service valve is open.

7. A fluid pressure brake apparatus comprising, in combination, a volume for storing fluid under pressure, suppression means having a normally vented chamber and responsive to pressure of fluid supplied to said chamber from said volume to effect suppression of a train control brake application, a normally charged equalizing reservoir, a normaly vented reduction limiting reservoir into which fluid under pressure in said equalizing reservoir may equalize for causing a limited degree of automatic brake application, a first service valve normally open for permitting such equalization and effective when closed to prevent such equalization, brake valve means manually operable independently of said first service valve and normally in one position for preventing such equalization and operable to another position for causing such equalization provided said first service valve is open, a branched communication leading from the brake valve means to said volume, check valve means interposed in one branch of said communication for permitting supply of fluid under pressure therethrough from said brake valve means to said volume and preventing reverse flow therethrough, and other valve means controlled by pressure of fluid in said reduction limiting reservoir and operative only when said reduction limiting reservoir is charged from said equalizing reservoir during and in consequence of such equalization to connect said volume to said brake valve means via another branch of said communication and in by-pass of said check valve means for permitting release of fluid under pressure from said volume, said brake valve means being operative in its said one position to supply fluid under pressure to said communication and in its said other position to cut off such supply and connect said communication to said chamber.

8. A fluid pressure brake apparatus comprising, in combination, a volume for storing fluid under pressure, suppression means having a normally vented chamber and responsive to pressure of fluid supplied to said chamber from said volume to effect suppression of a train control brake application, an equalizing reservoir, a reduction limiting reservoir, brake valve means operative in one position to supply fluid under pressure to said equalizing reservoir and vent said reduction limiting reservoir and operable to another position for permitting fluid under pressure in said equalizing reservoir to equalize into said reduction limiting reservoir for causing a brake application of a limited degree, a first communication through which fluid under pressure may be supplied to said volume from said brake valve means in its said one position, means for preventing reverse flow through said first communication, a second communication through which fluid under pressure may be released from said volume to said brake valve means, and other valve means for selectively opening said first communication or second communication according to whether said reduction limiting reservoir is vented or is charged with fluid under pressure from said equalizing reservoir, said brake valve means being operative in its said other position to open said volume to said chamber provided said second communication is opened by operation of said other valve means.

9. In a fluid pressure brake apparatus of the type comprising a first service valve effective when open to permit fluid under pressure in a normally charged equalizing reservoir to equalize into a normally vented reduction limiting reservoir to reduce equalizing reservoir pressure for causing an automatic brake application of a limited degree and effective when in a closed position to prevent such equalization, the combination of a volume for storing a limited quantity of fluid under pressure, suppression means responsive to pressure of fluid supplied to a chamber to effect suppression of a train control brake application until pressure of such fluid blows down below a chosen value, means providing a restricted rate of release of fluid under pressure from said chamber, brake valve means normally in one position for preventing such equalization of pressures in said reservoirs and manually operable to another position for causing such equalization provided the first service valve is open, other valve means controlled by the pressure of fluid in said reduction limiting reservoir and operative so long as such equalization is prevented to open one communication between said brake valve means and volume and responsive to an increase in reduction limiting reservoir pressure caused during such equalization to open another communication between said brake valve means and volume, and means for permitting flow through said one communication to said volume for charging the latter and preventing flow in the reverse direction through said one communication, said brake valve means being operative in its said one position to supply fluid under pressure to the branch of said one communication leading to said other valve means and in its said other position to cut off such supply and connect to said chamber the branch of said other communication extending from said brake valve means to said other valve means.

10. A fluid pressure brake apparatus comprising, in combination, a volume for storing fluid under pressure, suppression means having a normally vented chamber and responsive to pressure of fluid supplied to said chamber from said volume to effect suppression of a train control brake application, an equalizing reservoir, a reduction limiting reservoir, manually operable brake valve means having one position for charging said equalizing reservoir and venting said reduction limiting reservoir and closing a communication between said reservoirs and operable to a first service position for opening said communication to permit equalization of pressures of fluid in said reservoirs for causing a corresponding limited degree of automatic brake application, a normally open first service valve operable independently of said brake valve means to a closed position for closing said communication to prevent such equalization, other valve means controlled by the pressure of fluid in said reduction limiting reservoir and responsive to an increase in such pressure in consequence of such equalization to establish a connection between said volume and said brake valve means via one branch of another communication and ineffective to establish such connection in the absence of such increase in pressure, check valve means in a second branch of said other communication for permitting flow therethrough from said brake valve means to said volume and preventing reverse flow therethrough, said brake valve means being operative in its said one position to supply fluid under pressure to said volume via said second branch and check valve means and operative in its first service position to cut off such supply and release fluid under pressure from said volume to said chamber via said one branch provided said other valve means has operated to establish said connection.

11. A fluid pressure brake apparatus comprising, in combination, a brake pipe, an equalizing reservoir, brake pipe discharge valve means responsive to a reduction in pressure in said equalizing reservoir below that in said brake pipe to cause a corresponding reduction in brake pipe pressure, a reduction limiting reservoir, brake valve means normally in one position for venting said reduction limiting reservoir and supplying fluid under pressure to said brake pipe and equalizing reservoir and manually operable to another position for terminating venting of said reduction limiting reservoir and cutting off supply of fluid under pressure to said brake pipe and equalizing reservoir and causing pressure in said equalizing reservoir to equalize into said reduction limiting reservoir, a normally open manually operable first service valve effective when closed to prevent such equalization, timing means, a volume for storing a limited quantity of fluid under pressure, suppression valve means having a normally vented chamber and responsive to pressure of fluid supplied to said chamber from said volume to suppress a train control brake application for a predetermined period until such pressure blows down to below a predetermined value via said timing means, interlock valve means controlled by pressure of fluid in said reduction limiting reservoir and operative when said reduction limiting reservoir is vented to establish one communication through which fluid under pressure may be supplied to said suppression reservoir and responsive to pressurization of said reduction limiting reservoir to establish another communication through which fluid under pressure may be released from said volume, and check valve means interposed in said one communication for preventing release of fluid under pressure therepast from said volume, said brake valve means being operative in its said other position to connect to said chamber the branch of said other communication leading to said interlock valve means, whereby fluid under pressure will be released from said volume to said chamber via said brake valve means in its said other position only while said first service valve is open.

12. A fluid pressure brake apparatus comprising, in combination, a volume for storing fluid under pressure, suppression means having a normally vented chamber and responsive to pressure of fluid supplied to said chamber from said volume to effect suppression of a train control brake application, a normally charged equalizing reservoir, a normally vented reduction limiting reservoir into which fluid under pressure in said equalizing reservoir may equalize for causing a limited degree of automatic brake application, a first service valve normally open for permitting such equalization and effective when closed to prevent such equalization, brake valve means manually operable independently of said first service valve and normally in one position for preventing such equalization and operable to another position for causing such equalization provided said first service valve is open, a valve device comprising two alternatively operable valves controlling respective communications between said volume and brake valve means and also comprising a movable abutment normally positioned for opening one of said communications and responsive to pressure of fluid supplied to said reduction limiting reservoir during such equalization to successively effect closure of said one communication and opening of the other of said communications, said communications being defined in part by a common passage leading to said brake valve means, and check valve means interposed in said one communication intermediate said common passage and volume for permitting flow from said common passage to said volume and preventing reverse flow through said one communication, said brake valve means being operative in its said one position to supply fluid under pressure to said common passage for supply to said volume and operative in its said other position to cut off such supply to said common passage and connect said common passage to said chamber.

13. A fluid pressure brake apparatus comprising, in combination, a volume for storing fluid under pressure, suppression means having a normally vented chamber and responsive to the supply of fluid under pressure to said chamber from said volume for suppressing train control brake application, a normally vented reservoir into which a control pressure is adapted to equalize for causing a corresponding limited automatic application of brakes, a normally open first service valve effective when closed to prevent such equalization, a rotary valve manually operable independently of said first service valve and normally in one position for preventing such equalization and operable to a first service position for causing such equalization provided the first service valve is open, a passage open at one end to the seat of said rotary valve, two fluid pressure communications joining the opposite end of said passage and leading to said volume, means for permitting flow of fluid under pressure through one of said communications from said passage to said volume and preventing reverse flow therethrough, and valve means controlled by the pressure of fluid in said reservoir and operative to open the other of said communications only while said reservoir is charged during and in consequence of such equalization, said rotary valve being operative in its said one position to supply fluid under pressure to said passage for supply to said volume and in its said first service position to cut off such supply and connect said passage to said chamber for effecting release of fluid under pressure from said volume to said chamber provided said first service valve is open.

References Cited in the file of this patent

UNITED STATES PATENTS

| | | |
|---|---|---|
| 2,013,031 | Campbell | Sept. 3, 1935 |
| 2,322,042 | McClure | June 15, 1943 |